US010914248B2

(12) United States Patent
Heinisch et al.

(10) Patent No.: US 10,914,248 B2
(45) Date of Patent: Feb. 9, 2021

(54) EXHAUST GAS ROUTING SYSTEM HAVING AN ACTUABLE EXHAUST GAS TURBINE

(71) Applicant: Bayerische Motoren Werke Aktiengesellschaft, Munich (DE)

(72) Inventors: Andreas Heinisch, Dorfen (DE); Dirk Christian Leinhos, Groebenzell (DE); Claus Reulein, Treuchlingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/775,341

(22) Filed: Jan. 29, 2020

(65) Prior Publication Data

US 2020/0165990 A1  May 28, 2020

Related U.S. Application Data

(63) Continuation of application No. PCT/EP2018/074855, filed on Sep. 14, 2018.

(30) Foreign Application Priority Data

Nov. 17, 2017  (DE) .................... 10 2017 220 524

(51) Int. Cl.
*F02D 41/00* (2006.01)
*F02B 37/18* (2006.01)
(Continued)

(52) U.S. Cl.
CPC .......... *F02D 41/0007* (2013.01); *F02B 37/18* (2013.01); *F02B 39/10* (2013.01); *F02D 41/1446* (2013.01); *F02D 2200/0804* (2013.01)

(58) Field of Classification Search
CPC .... F01N 3/10; F01N 5/04; F02B 37/10; F02B 37/18; F02B 39/10; F02D 2200/0802;
(Continued)

(56) References Cited

U.S. PATENT DOCUMENTS 6,568,173 B1   5/2003   Kolmanovsky et al.
6,647,724 B1 * 11/2003  Arnold .................... F02B 33/36
                                            60/608
(Continued)

FOREIGN PATENT DOCUMENTS

DE    101 34 300 A1   2/2002
DE    103 49 164 A1   5/2004
(Continued)

OTHER PUBLICATIONS

International Search Report (PCT/ISA/210) issued in PCT Application No. PCT/EP2018/074855 dated Nov. 30, 2018 with English translation (seven pages).
(Continued)

Primary Examiner — Jesse S Bogue
(74) Attorney, Agent, or Firm — Crowell & Moring LLP

(57) ABSTRACT

A method and system for controlling temperature in an exhaust gas routing system of an internal combustion engine is provided. The exhaust gas routing system includes an exhaust gas manifold, an exhaust gas turbine which includes an electric machine arranged downstream of the exhaust gas manifold in the exhaust gas stream, an aftertreatment system arranged downstream of the exhaust gas turbine, and a control means configured to control the operation of the electric machine to adapt an operating mode of the exhaust gas turbine between motor operating, regeneration operating and neutral operating modes control means (50) such that the temperature of the aftertreatment system is controlled based on a target temperature.

12 Claims, 2 Drawing Sheets

(51) Int. Cl.
*F02B 39/10* (2006.01)
*F02D 41/14* (2006.01)

(58) Field of Classification Search
CPC ......... F02D 2200/0804; F02D 41/0007; F02D 41/1446; Y02A 50/20
See application file for complete search history.

(56) References Cited

U.S. PATENT DOCUMENTS

| | | | | |
|---|---|---|---|---|
| 6,871,498 | B1* | 3/2005 | Allen | F02B 37/12 |
| | | | | 60/608 |
| 7,434,399 | B2* | 10/2008 | Ishiwatari | F02D 41/0007 |
| | | | | 60/608 |
| 7,779,634 | B2* | 8/2010 | Barthelet | F02B 37/14 |
| | | | | 60/607 |
| 9,540,989 | B2* | 1/2017 | Sanchez Perez | F02B 37/14 |
| 9,797,300 | B2* | 10/2017 | Lofgren | F02B 37/14 |
| 10,094,263 | B2* | 10/2018 | Yamashita | F02D 23/02 |
| 2007/0151241 | A1* | 7/2007 | Arnold | F02B 37/24 |
| | | | | 60/605.1 |
| 2009/0107142 | A1 | 4/2009 | Russell et al. | |
| 2010/0082221 | A1 | 4/2010 | Sutchek et al. | |
| 2011/0022289 | A1* | 1/2011 | Hofbauer | F02D 41/0052 |
| | | | | 701/103 |
| 2011/0023478 | A1 | 2/2011 | Oakley et al. | |
| 2011/0107739 | A1* | 5/2011 | Shimizu | F02B 37/10 |
| | | | | 60/273 |
| 2012/0137676 | A1 | 6/2012 | Murata et al. | |
| 2013/0174547 | A1 | 7/2013 | Petrovic et al. | |
| 2015/0292399 | A1* | 10/2015 | Kubes | F02B 37/10 |
| | | | | 60/315 |

FOREIGN PATENT DOCUMENTS

| | | |
|---|---|---|
| DE | 10 2009 043 207 A1 | 7/2010 |
| DE | 10 2010 031 007 B4 | 1/2014 |
| DE | 10 2015 219 122 A1 | 4/2016 |
| DE | 10 2016 200 923 A1 | 7/2017 |
| DE | 10 2017 123 725 A1 | 11/2017 |

OTHER PUBLICATIONS

German-language Written Opinion (PCT/ISA/237) issued in PCT Application No. PCT/EP2018/074855 dated Nov. 30, 2018 (six pages).
German-language Office Action issued in counterpart German Application No. 10 2017 220 524.5 dated Aug. 10, 2018 (eight pages).

* cited by examiner

EXHAUST GAS ROUTING SYSTEM HAVING AN ACTUABLE EXHAUST GAS TURBINE

CROSS REFERENCE TO RELATED APPLICATIONS

This application is a continuation of PCT International Application No. PCT/EP2018/074855, filed Sep. 14, 2018, which claims priority under 35 U.S.C. § 119 from German Patent Application No. 10 2017 220 524.5, filed Nov. 17, 2017, the entire disclosures of which are herein expressly incorporated by reference.

BACKGROUND AND SUMMARY OF THE INVENTION

The invention relates to an exhaust gas routing system having an exhaust gas turbine for an internal combustion engine of a motor vehicle, to a drive for a motor vehicle having an internal combustion engine and such an exhaust gas routing system, as well as to a method for discharging exhaust gas from an internal combustion engine.

The invention will be described hereunder in the context of turbocharger drive concepts for motor vehicles while said invention may also be implemented having a disposed exhaust gas turbine which is disposed in the exhaust gas routing system but is not a component part of a turbocharger. The application potential of the invention per se is independent of the type of the internal combustion engine used, but the description is however offered using internal combustion four-stroke engines.

The turbocharging of induction air for the air/fuel mixture which is combusted in an internal combustion engine is generally known and is used in a wide range of applications. In the case of classic turbochargers, the kinetic energy from the exhaust gases of the internal combustion engine is used for driving the exhaust gas turbine of the turbocharger. A compressor which puts the induction air under a backpressure which because of the greater absolute quantity of oxygen of the pressurized air/fuel mixture enables a higher engine output in the internal combustion engine is connected in a rotationally fixed manner to the driven exhaust gas turbine at the induction air routing system side.

Electrically actuated turbochargers in which the induction air compressor is driven not only by means of the exhaust gas turbine but additionally by the superimposed torque of an electric machine disposed on the turbocharger shaft are also known. Thus a higher boost pressure and in turn an increased output of the internal combustion engine in the dynamic operation of the internal combustion engine, for example in the kick-down operation for overtaking maneuvers, can be achieved in this way.

It is moreover known for electrically actuated turbochargers to be used for recuperating energy from the exhaust gas in the exhaust gas routing system in that the electric machine is not switched to the motor operation but (as a generator) to the recuperation operation. Switching of this type is likewise expedient in the dynamic operation of the internal combustion engine, for example when the accelerator pedal is suddenly retracted from its position.

Turbocharged engines such as those described above in the event of a high prevailing boost pressure, in particular (but not exclusively) in combination with a high rotating speed of the internal combustion engine, have the tendency of dispensing the exhaust gases of said turbocharged engines to the exhaust gas routing system at a very high temperature.

This can be a problem, for example in terms of the integrity or durability of the exhaust gas turbine, as from exhaust gas temperatures of 900° C. to 1050° C., depending on the turbine material used. Adjustable exhaust gas turbines often cause problems already at lower temperatures. Moreover, there are also temperature limit values for the evermore complex exhaust gas post-processing, for example by way of three-way catalytic converters and optionally NOx catalytic converters, said temperature limit values when exceeded directly or at least over time damaging the catalytic converters.

This problem is commonly addressed by enriching the air/fuel mixture in higher induction pressure and/or rotating speed ranges of the engine map, that is to say by adding more fuel to the air/fuel mixture than would be required for a stoichiometrically complete conversion of the mixture in the combustion. On account thereof, the temperatures of the exhaust gases in the exhaust gas routing system can be significantly lowered because the combustion on account of the absence of oxygen at lambda values of less than one takes place at cooler temperatures, and moreover oxygen for the heat-producing exothermal reaction is absent in the exhaust gas post-treatment.

However, by virtue of the development of legal and standard requirements to be expected, it is to be expected that enriching as a temperature-lowering measure for the exhaust gases will be evermore restricted or possibly entirely eliminated in the future.

Against this background, it is an object of the invention to provide an improved exhaust gas routing system which promotes in particular the adherence to temperature limit values in the exhaust gas routing system and optionally the exhaust gas post-treatment.

According to one aspect of the invention, an exhaust gas routing system for an internal combustion engine of a motor vehicle is provided. The exhaust gas routing system has: a) an exhaust manifold which is in particular connected to the exhaust gas outlet of the internal combustion engine; b) an exhaust gas turbine which in the exhaust gas flow is disposed downstream of the exhaust manifold and which is preferably a component part of a turbocharger of the internal combustion engine, having an electric machine for adapting an operating mode of the exhaust gas turbine, wherein the rotor of the electric machine is preferably disposed on a rotating shaft of the exhaust gas turbine and is capable of being connected in a rotationally fixed manner, and/or is connected in a rotationally fixed manner, to the rotating shaft; c) a post-treatment infeed which in the exhaust gas flow is disposed downstream of the exhaust gas turbine and which is in particular capable of being connected, and/or is connected, to an exhaust gas post-treatment device; and d) a control means which is specified for actuating an operating mode of the electric machine, in particular a motor operation or a generator operation and/or the output of the motor/generator operation, as a function of an operating situation of the internal combustion engine.

The exhaust gas routing system moreover has e) a temperature detection means which is specified for detecting an in particular current exhaust gas temperature at at least one predetermined location in the exhaust gas routing system, wherein the control means is specified for adapting, in particular switching, the operating mode of the electric machine as a function of the detected characteristic of the exhaust gas temperature. The term "detecting" is presently to be understood in a broad sense such that, apart from a sensory detection, the reading of a temperature model which relates in particular to an internal combustion engine map is also included therein. An operating mode can be, for example, a motor operation, a generator operation, or a neutral operation of the electric machine, and thus also of the exhaust gas turbine.

According to one further aspect of the invention, a drive for a motor vehicle is provided, having an internal combustion engine and an exhaust gas routing system according to one embodiment of the invention. The control means herein A) as a function of the operating mode of the exhaust gas turbine is specified for adapting a lambda value of the air/fuel mixture injected in the internal combustion engine, in particular so as to increase said lambda value, preferably proceeding from a rich mixture toward a stoichiometric combustion, and/or B) for advancing an ignition timing of the mixture, thus in particular to move said ignition timing forward in temporal terms in relation to the cylinder position.

According to one further aspect of the invention, a method for discharging exhaust gas from an internal combustion engine is provided, said method comprising the steps: i) detecting an exhaust gas temperature at a predetermined location in the exhaust gas routing system, and ii) adapting, in particular switching, the operating mode of the exhaust gas turbine as a function of the detected characteristic of the exhaust gas temperature.

According to one further aspect of the invention, an embodiment of said method can be used in a method for operating an internal combustion engine, additionally comprising the steps: iii) increasing a lambda value of the air/fuel mixture injected in the internal combustion engine as a function of the operating mode of the exhaust gas turbine, and/or iv) advancing an ignition timing of the mixture, in particular moving forward in temporal terms the ignition timing in relation to the cylinder position.

The invention is based inter alia on the concept that the exhaust gas temperature at a plurality of locations in the exhaust gas routing system of turbocharged internal combustion engines in motor vehicles is a limiting factor in the operation of the drive. The present possibility of enriching the air/fuel mixture at least in terms of specific operating parts of the internal combustion engine is at risk of being eliminated in the future, in particular by virtue of expected statutory provisions. One requirement set for alternatives for influencing the exhaust gas temperatures in the exhaust gas routing system is the possibility of influencing the exhaust gas process management.

The invention is now based inter alia on the concept that in the case of vehicles having an electrically actuated turbocharger (hereunder also referred to as eATC), said turbocharger in most operating states of the internal combustion engine is used only in a neutral operating mode, the potential additional function thereof by way of the electric machine thus not being used at all. In the case of present vehicles having an eATC, the latter is used only for increasing output/increasing dynamics in the full-load range, and/or as a recuperation component for electrical energy when the propulsion request is suddenly revoked. In other operating states, and thus during the majority of the operation of the vehicle, the eATC is simply used as a conventional turbocharger.

The inventors have now discovered that the exhaust gas process management, and thus also the exhaust gas temperature, can be influenced by a suitable use of an electrically actuated turbocharger, and in particular of the exhaust gas turbine thereof. This potential influence also exists in the partial-load range and in the static operation of the internal combustion engine.

For example, an operation of the exhaust gas turbine of the eATC in the motor operation, thus for accelerating the exhaust gas outward transportation, for example, enables the exhaust gas back pressure ahead of the turbine to be lowered. The internal engine load drops on account of this lowering, which is why the ignition of the mixture can take place earlier without an increased risk of engine knocking, and the exhaust gas temperature thus being able to be lowered at the exhaust gas turbine per se. If this mechanism is always used when a high exhaust gas temperature that is damaging to the exhaust gas turbine is to be anticipated, consequently a less heat-resistant material can be used for the exhaust gas turbine, and/or the enrichment of the mixture can be dispensed with in more/all operating states of the internal combustion engine, or said enrichment can at least be minimized.

A further example: an operation of the exhaust gas turbine of the eATC in the generator operation, thus opposing the exhaust gas outward transportation by way of a torque, enables an increase of the output of the exhaust gas turbine. To this end, the mass flow by way of the wastegate is preferably reduced. On account thereof, and on account of the exhaust gas being routed by way of a longer path through the turbine, the exhaust gas arrives at the exhaust gas post-treatment device at a lower average temperature. Since temperature limit values also apply to the various catalytic converters of a typical exhaust gas post-treatment device, this generator operation of the eATC enables the enriching of the mixture to be partially or completely dispensed with in terms of further operating cases. Additionally or alternatively, the use of catalytic converters having lower temperature limit values would also be conceivable.

A further insight lies in the possibility of providing in the sense of the invention a feedback controller by way of an existing exhaust gas temperature model and/or existing exhaust gas temperature sensors, said feedback controller setting the operation of the machine of the exhaust gas turbine in a manner analogous to those of the exemplary applications illustrated in the last paragraphs in such a manner that, at the different temperature-critical locations in the exhaust gas routing system, a combined optimum below the dissimilarly established temperature limit values at predetermined locations in the exhaust gas routing system is in each case achieved, for example at a location ahead of the exhaust gas turbine and at a location at the end of the exhaust gas routing system/ahead of an exhaust gas post-treatment device.

According to one embodiment, the control means is specified for switching the electric machine, and thus also the exhaust gas turbine, between a motor operation, a recuperation operation (=generator operation), and optionally a neutral operation, so as to influence, in particular lower, the exhaust gas temperature in a targeted manner and in particular also at different locations in the exhaust gas routing system.

"Switching" the operating mode herein is firstly to be understood that switching takes place in one or the other direction, between a motor operation and a recuperation operation, or that switching takes place in the one or the other direction, between a neutral operation on the one hand, and the motor operation or the recuperation operation on the other hand. Said "switching" herein is in particular intended for differentiating from "adapting" which also describes adapting the switched output of the motor operation or of the recuperation operation in the sense of adapting the already switched operating mode.

In order for the exhaust gas turbine per se to be protected from thermal overload, the temperature detection according to one embodiment is specified for detecting the exhaust gas temperature in the exhaust gas flow ahead of the exhaust gas turbine, in particular in the exhaust manifold or in an exhaust gas routing system component of the exhaust gas turbine.

In order for the component parts of an exhaust gas post-treatment device to be protected from thermal overload, the temperature detection according to one embodiment is specified for detecting the exhaust gas temperature in the exhaust gas flow at the downstream end of the post-treatment infeed and/or in an exhaust gas post-treatment device connected to the latter.

In order to enable an ideally flexible integration in the motor vehicle and/or a temperature detection that is suitable for the specific application, the temperature detection according to one embodiment has at least one, in particular two or more, temperature sensors for detecting values of the exhaust gas temperature at at least one, in particular two or more, predetermined locations, preferably are in the region of the exhaust gas turbine and are at the downstream end of the exhaust gas routing system. In one additional or alternative embodiment, the temperature detection for detecting values of the exhaust gas temperature at at least one, in particular two or more, predetermined locations has a stored temperature model of the internal combustion engine and/or the exhaust gas routing system, said stored temperature model being readable by means of the control means. A separate temperature model for each location, or an integrated temperature model for a plurality of locations can be used herein.

In order for a recuperation operation of the exhaust gas turbine to be able to be better controlled, the exhaust gas turbine according to one embodiment has a wastegate line having a wastegate valve which, in particular as a function of the operating mode of the exhaust gas turbine, is specified for adapting a mass flow of exhaust gas that is directed so as to bypass the exhaust gas turbine, in particular toward the exhaust gas post-treatment installation.

In order for the invention to be able to be applied in typical turbocharged internal combustion engines, the exhaust gas turbine according to one embodiment is a component of a turbocharger of the internal combustion engine at the exhaust gas side.

According to one embodiment, switching the exhaust gas turbine between a motor operation, a recuperation operation, and optionally a neutral operation, is provided for adapting the operating mode.

In order for the exhaust gas temperature to be kept in a temperature region that is not damaging to the component passed through by the flow, the detected characteristic of the exhaust gas temperature according to one embodiment is compared with a stored limit value.

The exhaust gas turbine can in particular be protected from thermal overload in that the exhaust gas turbine according to one embodiment is switched to the motor operation when the detected characteristic of the exhaust gas temperature in the exhaust gas flow ahead of the exhaust gas turbine approaches, reaches, or exceeds the limit value stored in particular to this end.

The exhaust gas post-treatment device can in particular be protected from thermal overload in that the exhaust gas turbine according to one embodiment is switched to the recuperation operation when the detected characteristic of the exhaust gas temperature in the exhaust gas flow at the downstream end of the post-treatment infeed, and/or in an exhaust gas post-treatment device connected to the latter, approaches, reaches, or exceeds the limit value stored in particular to this end.

In order to provide a sufficient exhaust gas mass flow, or sufficient kinetic energy for the recuperation operation, respectively, according to one embodiment a wastegate valve of a wastegate of the exhaust gas routing system is partially or fully closed when the exhaust gas turbine is operated in the recuperation operation.

In order for the closed-loop controlling of the exhaust gas temperature to be further improved, the switched output at which the exhaust gas turbine is operated in the motor operation or in the generator operation according to one embodiment is higher the higher the detected exhaust gas temperature, in particular also in comparison to an associated limit value for the exhaust gas temperature at the detected location. Switching to a higher output both in the motor operation as well as in the recuperation operation can increase the effect of lowering the temperature described in the context of the respective operating mode.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
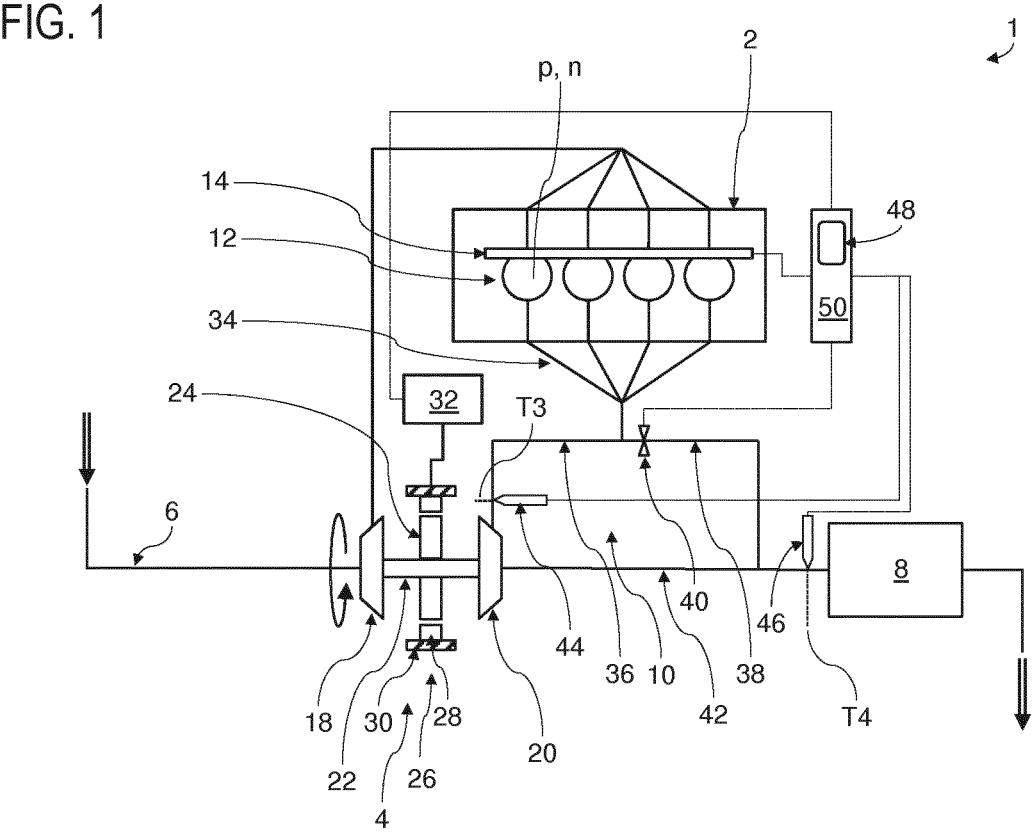
FIG. 1 shows a vehicle drive having an internal combustion engine, an electrically actuated turbocharger, an induction air infeed, an exhaust gas post-treatment device, as well as an exhaust gas routing system according to an exemplary embodiment of the invention in an abstracted diagram, wherein the eATC is illustrated in a neutral operating mode.

A vehicle drive 1 having an internal combustion engine 2, an electrically actuated turbocharger (eATC) 4, an induction air infeed 6, an exhaust gas post-treatment device 8, and an exhaust gas routing system 10 according to an embodiment of the invention is illustrated in FIG. 1. The illustration of the various fluid routing systems is highly simplified and is not intended to explain all of the details of the vehicle drive 1 but only the concept of the invention and specific embodiments. For example, neither an exhaust gas return routing system nor the divert-air valve is thus illustrated, despite said components, as well as other components, being installed in many turbo engines.

The internal combustion engine 2 in the embodiment has four cylinders 12 (may however also have more or fewer cylinders) which by the induction air infeed 6 and an injection unit 14 are supplied with an air/fuel mixture. Spark plugs that may optionally be present are not separately illustrated.

The eATC 4 has a compressor 18 in the induction air infeed 6, and a turbine 20 which is connected by a shaft 22 in a rotationally fixed manner to the compressor 18. A rotor 24 of an electric machine 26 which moreover has a stator 28 which is mounted so as to be rotationally fixed on a body part 30 is disposed so as to be capable of being connected in a rotationally fixed manner to the shaft 22, or so as to be connected in a rotationally fixed manner to the latter. An operating unit 32 which for transmitting electric power as well as control signals, status signals, sensor signals, etc. has an electric power accumulator and a communications interface to a control means is disposed so as to be connected to the electric machine 26.

The turbine 20 of the eATC 4 is made from a highly temperature resistant material which in the embodiment can withstand an exhaust gas temperature up to 950° C. such that a temperature limit value of this magnitude is established for the turbine 20. Other limit values can of course also be provided.

The exhaust gas post-treatment device 8 preferably has a three-way catalytic converter and optionally a NOx catalytic converter and/or further catalytic converter units. The three-way catalytic converter is configured such that said three-way catalytic converter can convert exhaust gases up to a temperature of 900° C. without damage to the delicate reactive surfaces. Therefore, a temperature limit value of this magnitude is established for the exhaust gas post-treatment device 8 in the embodiment (a higher or a lower limit value can also be set in the case of refinements of the catalytic converter).

The exhaust gas routing system 10 and the components thereof are described hereunder so as to be sorted in a manner corresponding to the flow direction of the exhaust gases: an exhaust manifold 34 discharges the hot exhaust gases from the combustion in the cylinders 12 and bundles said exhaust gases in a turbine infeed 36. A wastegate 38 having a wastegate valve 40 branches off from the turbine infeed 36. The turbine infeed 36 per se opens into a turbine routing system (not illustrated) in which the turbine 20 of the eATC 4, configured as an exhaust gas turbine of the exhaust gas routing system 10, is disposed. A post-treatment infeed 42 into which the wastegate 38 opens is disposed downstream of the turbine 20. The post-treatment infeed 42 per se on the downstream side opens into the exhaust gas post-treatment device 8.

In the illustration of FIG. 1, a first temperature sensor 44 is illustrated in the exhaust gas flow directly ahead of the turbine 20, and a second temperature sensor 46 is illustrated in the exhaust gas flow directly ahead of the post-treatment device 8. Both temperature sensors 44, 46 are in each case specified for detecting a characteristic of an exhaust gas temperature in real-time at the predetermined location T3, and T4, respectively, where said temperature sensors 44, 46 are disposed.

With a view to the embodiment of the invention illustrated, it is however likewise possible for the detection of the temperature not to take place by the temperature sensors 44 and 46, or not to take place exclusively by the latter, but exclusively by a corresponding temperature model 48 for the respective location, or at least by a comparison between the characteristics detected by the sensors 44 and 46 and the temperature model 48.

Such a temperature model 48 for a multiplicity of combinations of operating key performance indicators provides with sufficient accuracy and reliability, preferably as a function of the operating key performance indicators of the drive 1, in each case a temperature to be expected at the observed location of the exhaust gas routing system 10. In the embodiment, a temperature model 48 in which temperatures to be expected at the exhaust gas turbine 20, or at the exhaust gas post-treatment device 8, are stored for a multiplicity of value pairs of an exhaust gas pressure p in the cylinder 12, on the one hand, and a rotating speed n of the internal combustion engine 2, on the other hand, can be applied, for example.

The exhaust gas routing system moreover has a control means 50 which for transmitting control commands and/or status data and/or sensor data is connected to the temperature sensors 44 and 46, to the valve 40, to the operating unit 32 of the electric machine 26, to the injection unit 14, as well as to the temperature models 48. The control means 50 can also be configured so as to be integrated in the control means of the internal combustion engine 2, of the drive 1, or of the entire motor vehicle.

The arrows in double lines at the upstream side of the induction air infeed 6 and on the downstream side symbolize a mass flow of induction air at an inlet or an entry system limit, or a mass flow of post-treated exhaust gases at an exhaust installation or at an exit system limit, respectively.

The eATC 4 in the illustration of FIG. 1 operates in the neutral operation. This is illustrated by the curved arrow to the left of the compressor 18 which is intended to highlight a rotation of the rotationally fixed assembly of the exhaust gas turbine 20 and the compressor 18 purely on account of the kinetic energy of the exhaust gas directed through the turbine 20.

Such a neutral operation is to be considered, for example, when an exhaust gas temperature close to the respective limit value is not derived for any of the monitored locations from the detected values of the temperature sensors 44 and 46, and/or from the values which the control means 50 reads from the temperature models 48.

Figure 2:
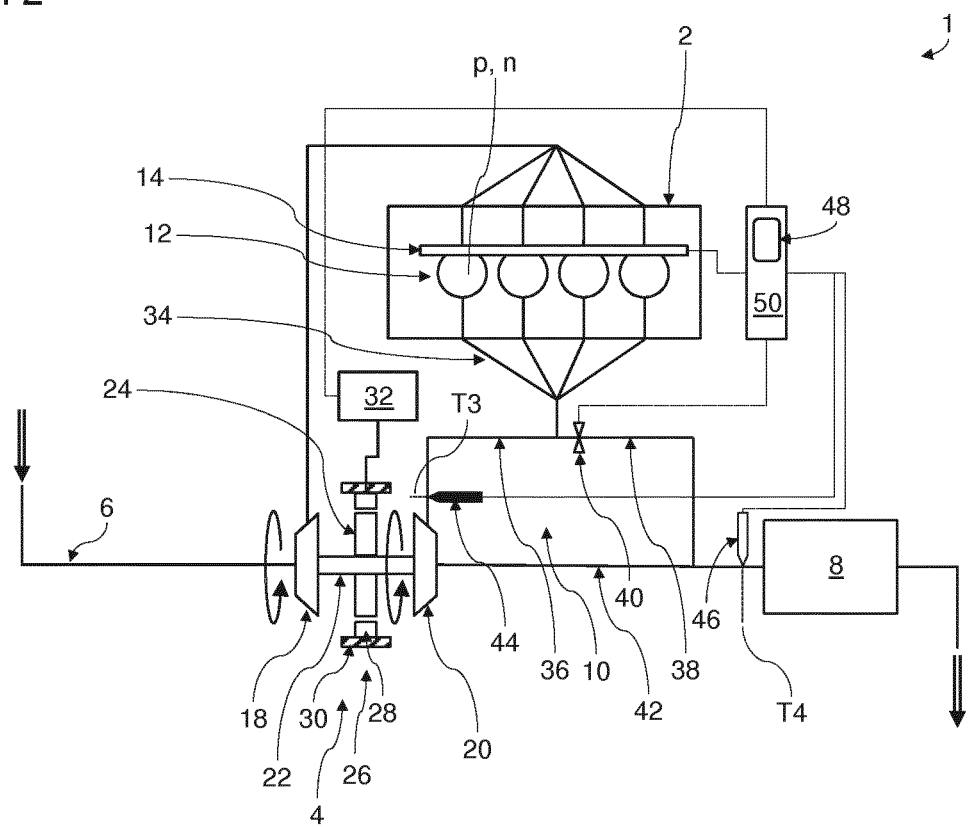
FIG. 2 shows the vehicle drive from FIG. 1, wherein the exhaust gas temperature in the region of the exhaust gas turbine is characterized so as to be close to the temperature limit value for this location.
Figure 3:
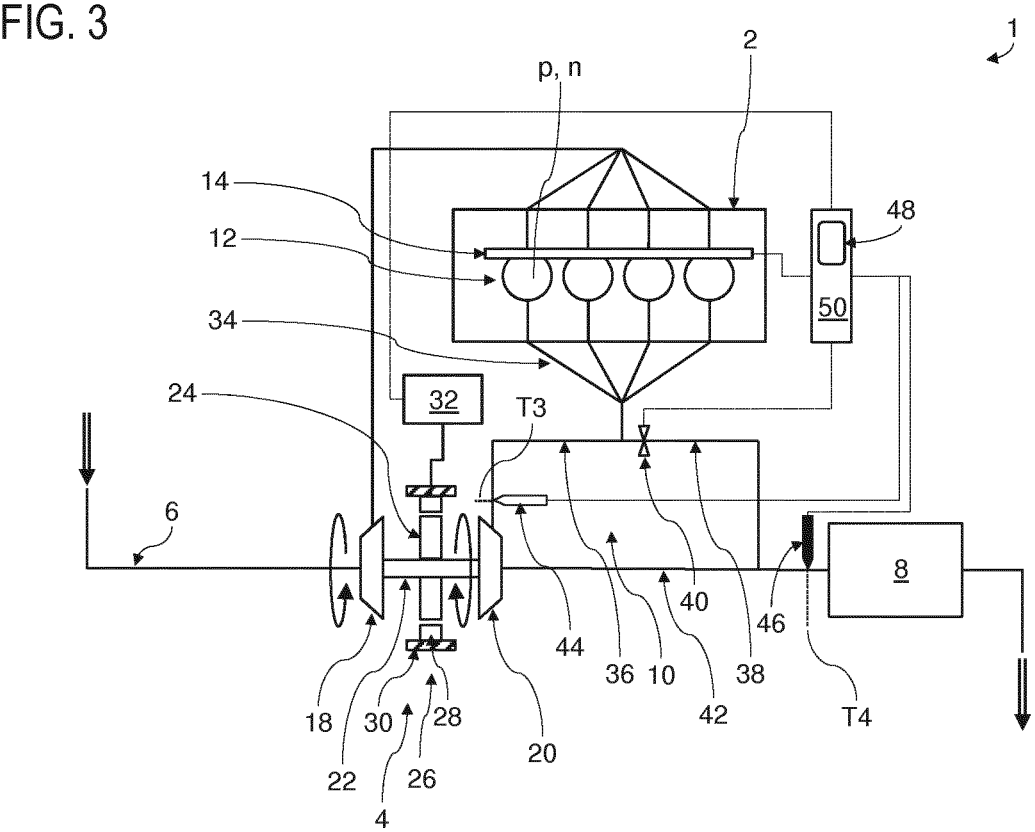
FIG. 3 shows the vehicle drive from FIG. 1, wherein the exhaust gas temperature in the region of the exhaust gas post-treatment device is characterized so as to be close to the temperature limit value for this location.

The functional mode of the invention and in particular the steps of a method according to an embodiment of the invention are described hereunder by means of FIGS. 2 and 3.

FIG. 2 shows an operating case in which the control means 50 based on the detected characteristic of the exhaust gas temperature (by the temperature sensor 44 or by the temperature model 48) identifies an excessively high exhaust gas temperature in the region of the exhaust gas turbine 20. Such a case can arise, for example, when the detected temperature value is close to the limit value, corresponds to said limit value, or exceeds said limit value, and/or when a temperature gradient suggests that the limit value will be exceeded in the absence of countermeasures. The high value detected is illustrated in FIG. 2 in that the temperature sensor 44 is illustrated so as to be black.

The control means 50 has thus now determined that the exhaust gas is too hot for the exhaust gas turbine 20. In order for this to be counteracted, said control means 50 switches the operating mode of the electric machine 26 of the eATC 4 and adapts said operating mode, optionally as a function of the magnitude of the transgression, specifically proceeding from the neutral operation toward a motor operation having an output which is stored in an operating model in the control means 50, for example, which can be a function of the level of the temperature.

The electric machine 26 by way of the torque thereof thus now acts in the direction in which the exhaust gas to be discharged at the exhaust gas turbine 20 rotates the latter. This in FIG. 2 is illustrated by way of the curved arrow plotted between the turbine 20 and the rotor 24.

The rotation of the exhaust gas turbine 20 is accelerated, this causing a decrease in the exhaust gas back pressure ahead of the turbine. The internal engine load drops on account of said decrease, which is why the ignition of the mixture, for example by spark plugs at the injection unit 14, can take place earlier and thus the exhaust gas temperature T3 per se at the exhaust gas turbine 20 can be lowered. When the exhaust gas temperature at the turbine 20 has been sufficiently lowered in this way, enriching of the air/fuel mixture by way of the injection unit 14 can be reduced or discontinued by the control means 50, for example.

A use of this type of the motor operation of the exhaust gas turbine 20 in the present embodiment is to be considered as from rotating speeds of the internal combustion engine of approx. 1700/min, when the exhaust gas pressure herein is close to a maximum of approx. 2900 kPA. In the range of maximum rotating speeds of approx. 6500/min, the motor operation of the exhaust gas turbine 20 can already act in a supporting manner as from an exhaust gas pressure of approx. 1600 kPA. Simulations resulted in the temperature being lowered in the magnitude of up to 20° C.

FIG. 3 shows an operating case in which the control means 50 based on the detected characteristic of the exhaust gas temperature (by the temperature sensor 46 or by the temperature model 48) identifies an excessively high exhaust gas temperature in the region of the exhaust gas post-treatment device 8. Such a case can arise, for example, when the detected temperature value is close to the limit value, corresponds to said limit value, or exceeds said limit value, and/or when a temperature gradient suggests that the limit value will be exceeded in the absence of countermeasures. The high value detected is illustrated in FIG. 3 in that the temperature sensor 46 is illustrated so as to be black.

Therefore the control means 50 has now determined that the exhaust gas is too hot for the exhaust gas post-treatment device 8. In order for this to be counteracted, said control means 50 switches the operating mode of the electric machine 26 of the eATC 4 and adapts said operating mode, optionally as a function of the magnitude of the transgression, specifically from the neutral operation toward a recuperation operation having an output which is stored in an operating model in the control means 50, for example, which can be a function of the level of the temperature.

The electric machine 26 by way of the torque thereof thus now acts counter to the direction in which the exhaust gas to be discharged at the exhaust gas turbine 20 rotates the latter. This in FIG. 3 is illustrated by the curved arrow plotted between the turbine 20 and the rotor 24, said arrow having a reversed rotation direction as compared to the illustration in FIG. 2.

Moreover, the valve 40 is at least partially closed by the control unit 50 such that, by virtue of the increased exhaust gas mass flow, an increase in the output of the exhaust gas turbine in the generator operation is enabled. At the same time, the mass flow by way of the wastegate 38 is reduced. On account thereof, and on account of the routing of the exhaust gas by way of the longer path through the turbine 20, the exhaust gas at the location T4 arrives at a lower average temperature, said location T4 for detecting the temperature being assigned to the exhaust gas post-treatment device 8. In the operating case described, the generator of the eATC 4 thus also enables the mixture enrichment to be partially or completely dispensed with.

A use of this type of the generator operation of the exhaust gas turbine 20 in the present embodiment is to be considered as from rotating speeds of the internal combustion engine of approx. 2000/min, when the exhaust gas pressure here in is close to a maximum of approx. 2900 kPA. In the range of maximum rotating speeds of approx. 6500/min, the generator operation of the exhaust gas turbine 20 can already act in a supporting manner as from an exhaust gas pressure of approx. 1000 kPA.

The operating cases illustrated in FIGS. 2 and 3 in the present exemplary embodiment can be combined with one another; a feedback controller which sets the operation of the electric machine 26 and thus of the exhaust gas turbine 20 in such a manner that, at the different temperature-critical locations T3 and T4 in the exhaust gas routing system 10, a combined optimum below the dissimilarly established temperature limit values is in each case achieved at predetermined locations in the exhaust gas routing system, for example at a location T3 at the exhaust gas turbine 20, and at a location T4 at the exhaust gas post-treatment device 8, can be provided by way of the existing exhaust gas temperature models 48 and/or the existing exhaust gas temperature sensors 44 and/or 46.

Depending on at which of the two locations T3 and T4 a "more critical case" is present in terms of exhaust gas temperature or exhaust gas temperature development, the control means 50 can determine whether a motor operation mode for lowering the temperature at the location T3 or a recuperation operation mode for lowering the temperature at the location T4 is appropriate. In a manner corresponding to the detected characteristics, the electric machine 26 can then be switched to the motor operation or to the recuperation operation. The electric machine preferably remains in a neutral operating state should it not be possible to clearly differentiate whether switching for lowering the exhaust gas temperature at the one location would have an undesirable negative effect in terms of the exhaust gas temperature at the other location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Vehicle drive
2 Internal combustion engine
4 Electrically actuated turbocharger (eATC)
6 Induction air infeed
8 Exhaust gas post-treatment device
10 Exhaust gas routing system
12 Cylinder
14 Injection unit
18 Compressor
20 Exhaust gas turbine
22 Shaft
24 Rotor
26 Electric machine
28 Stator
30 Body part
32 Operating unit
34 Exhaust manifold
36 Turbine infeed
38 Wastegate
40 Wastegate valve
42 Post-treatment infeed
44 First temperature sensor
46 Second temperature sensor
48 Temperature models
50 Control means
T3 Location in the exhaust gas routing system ahead of the exhaust gas turbine T4 Location in the exhaust gas routing system ahead of the exhaust gas post-treatment device
p Exhaust gas pressure
n Rotating speed of the internal combustion engine

What is claimed is:

1. An exhaust gas routing system for an internal combustion engine of a machine vehicle, comprising:
    an exhaust manifold;
    an exhaust gas turbine arranged downstream of the exhaust manifold in a flow direction of an exhaust gas flow from the internal combustion engine, wherein
        the exhaust gas turbine including an electric machine configured to transfer torque to and receive torque from the exhaust gas turbine, and
        the exhaust gas turbine, a rotor of the electric machine and an intake compressor are fixed for co-rotation on a common shaft;
    a post-treatment infeed configured to receive the exhaust gas flow from the exhaust gas turbine; and
    a control means configured to actuate an operating mode of the electric machine as a function of an operating situation of the internal combustion engine;
    a first temperature detector configured to detect an exhaust gas temperature upstream of the exhaust gas turbine in the exhaust gas routing system; and
    a second temperature detector configured to detect an exhaust gas temperature at a location in the exhaust gas routing system between the exhaust gas turbine and the post-treatment infeed;
    wherein the control means is configured to switch the operating mode of the electric machine as a function of the exhaust gas temperature detected by the first and second temperature detectors, such that
        when an exhaust gas turbine inlet exhaust gas temperature detected by the first temperature detector reaches a first predetermined temperature limit, the operating mode of the electric machine is switched to a machine operation mode in which the electric machine is operated to increase a rotation speed of the exhaust gas turbine,
        when a post-treatment infeed temperature detected by the second temperature detector reaches a second predetermined temperature post-treatment infeed temperature limit, the operating mode of the electric machine is switched to a recuperation machine operation mode in which the electric machine is operated as a generator to decrease a rotation speed of the exhaust gas turbine.

2. The exhaust gas routing system according to claim 1, wherein
    the control means is configured to switch the operating mode of the electric machine between machine operation mode and recuperation operation mode.

3. The exhaust gas routing system according to claim 2, wherein
    the control means is configured to also switch the electric machine the operating mode to a neutral operation mode in which the electric machine does not apply torque to the common shaft.

4. The exhaust gas routing system according to claim 1, wherein
    the control means is configured to control the electric machine operating mode using temperature detected by one or both of the first and second temperature detectors and a stored temperature model of one or both of the internal combustion engine and the exhaust gas routing system.

5. The exhaust gas routing system according to claim 1, further comprising:
    a wastegate line in the exhaust gas routing system between location upstream and downstream of the exhaust gas turbocharger, the wastegate line including a wastegate valve controlled by the control means,
    wherein the wastegate valve is partially or fully closed when the exhaust gas turbine is operating in the recuperation operation mode.

6. A drive for a machine vehicle, comprising:
    an internal combustion engine; and
    the exhaust gas routing system of claim 1,
    wherein the control means is configured to control one or both of adaptation of a lambda value of the air/fuel mixture injected in the internal combustion engine and advance of an ignition timing of the mixture, as a function of the operating mode of the exhaust gas turbine.

7. A method for discharging exhaust gases from an internal combustion engine having an exhaust gas routing system which includes
    an exhaust gas turbocharger, the exhaust turbocharger including and exhaust gas turbine, and electric machine and an intake compressor, wherein the exhaust gas turbine, a rotor of the electric machine and the intake compressor are fixed for co-rotation on a common shaft,
    a post-treatment infeed configured to receive exhaust gas flow from the exhaust gas turbine,
    a first temperature detector configured to detect an exhaust gas temperature upstream of the exhaust gas turbine in the exhaust gas routing system, and
    a second temperature detector configured to detect an exhaust gas temperature at a location in the exhaust gas routing system between the exhaust gas turbine and the post-treatment infeed,
comprising the acts of:
    detecting an exhaust gas temperature upstream of the exhaust gas turbine with the first temperature detector and an exhaust gas temperature between the exhaust gas turbine and the post-treatment infeed with the second temperature detector; and
    switching an operating mode of an electric machine of the exhaust gas turbine as a function of the exhaust gas temperature detected by the first and second temperature detectors such that
        when an exhaust gas turbine inlet exhaust gas temperature detected by the first temperature detector reaches a first predetermined temperature limit, the operating mode of the electric machine is switched to a machine operation mode in which the electric machine is operated to increase a rotation speed of the exhaust gas turbine,
        when a post-treatment infeed temperature detected by the second temperature detector reaches a second predetermined temperature post-treatment infeed temperature limit, the operating mode of the electric machine is switched to a recuperation machine operation mode in which the electric machine is operated as a generator to decrease a rotation speed of the exhaust gas turbine.

8. The method according to claim 7, wherein:
    the switching of the operating mode includes switching the exhaust gas turbine between a machine operation mode and a recuperation operation mode.

9. The method according to claim 8, wherein:
the switching of the operating mode also switching to a neutral operation mode in which the electric machine does not apply torque to the common shaft.

10. The method according to claim 8, wherein
the detected exhaust gas temperatures are compared with the predetermined temperature limits stored in a controller.

11. The method according to claim 8, further comprising:
a wastegate line in the exhaust gas routing system between location upstream and downstream of the exhaust gas turbocharger, the wastegate line including a wastegate valve controlled by the control means,
wherein the wastegate valve is partially or fully closed when the exhaust gas turbine is operating in the recuperation operation mode.

12. The method according to claim 8, wherein
the exhaust gas turbine is operated to generate a torque applied to the common shaft in the machine operation mode or in the recuperation operation mode which increases as the exhaust gas temperature detected by the first or second temperature detectors exceeds their respective associated temperature limits.

* * * * *